US012682737B1

(12) United States Patent
Mulholland

(10) Patent No.: US 12,682,737 B1
(45) Date of Patent: Jul. 14, 2026

(54) FIRE DETECTION DEVICE AND METHOD OF USING THE SAME

(71) Applicant: Ryan James Mulholland, Anchorage, AK (US)

(72) Inventor: Ryan James Mulholland, Anchorage, AK (US)

( * ) Notice: Subject to any disclaimer, the term of this patent is extended or adjusted under 35 U.S.C. 154(b) by 386 days.

(21) Appl. No.: 18/441,585

(22) Filed: Feb. 14, 2024

Related U.S. Application Data

(60) Provisional application No. 63/518,435, filed on Aug. 9, 2023.

(51) Int. Cl.
*G08B 17/10* (2006.01)

(52) U.S. Cl.
CPC .................................... *G08B 17/10* (2013.01)

(58) Field of Classification Search
CPC ...................................................... G08B 17/10
See application file for complete search history.

(56) References Cited

U.S. PATENT DOCUMENTS 2,703,545 A * 3/1955 Sumerak ................ G08B 17/04 116/DIG. 44
2,750,916 A * 6/1956 Hanington ............... G01K 5/62 116/102
2,758,563 A * 8/1956 Bigelow ................ G08B 17/04 116/DIG. 44
2,760,461 A * 8/1956 Showstack ........... A62C 99/009 116/DIG. 44
4,052,690 A * 10/1977 Jacoby ................... H01H 37/76 337/403
4,098,220 A * 7/1978 Yuhas .................... G08B 17/04 116/106
4,265,194 A * 5/1981 Sullivan ................. G08B 17/06 374/E11.006
5,791,282 A * 8/1998 Christ-Janer ............ G08B 7/06 116/5
6,189,479 B1 * 2/2001 Hudson .................. G01K 11/06 374/E11.006

(Continued)

FOREIGN PATENT DOCUMENTS

ES 2543595 T3 8/2015

OTHER PUBLICATIONS

GB-2079911-A; Briskman, "Tumble Dryers", 1982. (Year: 1982).*

*Primary Examiner* — Kristina M Deherrera
*Assistant Examiner* — Tania Courson
(74) *Attorney, Agent, or Firm* — John Rizvi; John Rizvi, P.A.—The Patent Professor ®

(57) ABSTRACT

A fire detection device is provided herein, specifically a gasket that is attached to at least one cartridge containing carbon dioxide. The gasket is located between a dryer body and a dryer vent, and wherein the gasket is attached to the dryer vent. The cartridge is made of a material that melts when in contact with a fire, and which then results in the release of the carbon dioxide contained therein. The gasket contains perforations, through which the released carbon dioxide flows when released, and which causes a whistling noise to be emitted to alert to the presence of a dryer fire. There is also provided herein a method for detecting fires which can comprise mounting the fire detection device within a clothes drier. The device and method of the present invention may be useful in providing clear and efficient alerts to clothes dryer fires.

20 Claims, 7 Drawing Sheets

(56) References Cited

U.S. PATENT DOCUMENTS

| | | | |
|---|---|---|---|
| 6,655,047 B2 | 12/2003 | Miller, II | |
| 6,715,216 B1 | 4/2004 | Salameh et al. | |
| 8,429,833 B2 * | 4/2013 | Harpenau | D06F 58/50 34/558 |
| 9,022,065 B1 * | 5/2015 | Kliewer | F17D 5/02 137/557 |
| 9,297,493 B2 | 3/2016 | Bison et al. | |
| 9,327,152 B2 | 5/2016 | Dolton | |
| 10,181,245 B2 * | 1/2019 | Krula | G08B 21/182 |
| 2003/0010509 A1 * | 1/2003 | Hoffman | A62C 37/21 169/56 |
| 2007/0124953 A1 | 6/2007 | Crnkovich | |
| 2021/0214884 A1 | 7/2021 | Smith | |
| 2022/0106730 A1 | 4/2022 | Reeves et al. | |

* cited by examiner

FIRE DETECTION DEVICE AND METHOD OF USING THE SAME

CROSS-REFERENCE TO RELATED APPLICATIONS

This application claims the benefit of U.S. Provisional Patent Application Ser. No. 63/518,435, filed on Aug. 9, 2023, which is incorporated by reference herein in its entirety.

FIELD OF THE INVENTION

The present invention relates generally to the field of fire prevention. More particularly, the present invention relates generally to fire alarms.

BACKGROUND OF THE INVENTION

A high percentage of home fires are caused by clothing washing machine and dryer fires. According to the National Fire Protection Association (NFPA), on average, about 15,970 home fires in the United States were caused by dryers and washing machines.

Home structure fires can be devastating, causing loss of life and injuries to both civilians and first responders. An estimated 4,000 Americans die each year due to home structure fires, and about 2,000 individuals sustain injuries due to home structure fires. Even if bodily injury does not occur, home structure fires can also result in the irretrievable loss of sentimental belongings, extensive property damage, and displacement of occupants. Home structure fires cause rapid damage; even if the flames have not yet spread from room to room, temperatures in the home may reach over 1,000 degrees Fahrenheit in less than five minutes from the onset of a fire.

Most home fires originate from home appliances. The danger of leaving smaller appliances plugged in when not in use is generally known. However, when it comes to washers, dryers, and other large appliances, it is not practicable to unplug these appliances when not in use. Most home occupants do not even consider unplugging large appliances like washers, dryers, refrigerators, dishwashers, or ranges. Part of the reason for this may be the effort required to disconnect and reconnect the plug from an outlet, which involves moving the large and generally heavy appliance, as well as the frequency of use of large appliances, which are often used daily.

Comparing fires caused by clothing dryers and clothing washing machines, the vast majority of house fires are caused by clothing dryers. Clothing dryers typically have three main basic parts: a tumbler, a heater, and a vent. The heater component can either be powered by gas or electricity. The exhaust vent extends from the clothing dryer to the outside of the building. An exhaust vent may also connect to an HVAC system within a home.

Clothing dryer drums are commonly made of either stainless steel, plastic, or stainless steel with a porcelain coating. Stainless steel is often seen as the best choice due to its resistance to damage. The porcelain-coated models are seen as lesser quality than stainless steel because of the tendency of porcelain to chip, exposing the material underneath, which can be subject to rust and other damage. Plastic drums, although lightweight, can suffer wear and tear more easily than either stainless steel or porcelain-coated dryer drums. The wear and tear of the drum itself can lead to snagging and catching of clothing as it tumbles through a drying cycle, damaging the clothing and increasing risk of potential fires if clothing snags and overheats. Dryer drums can also vary in size, ranging from around 3.5 cubic feet up to 7 cubic feet. Dryer drum size has a significant impact on the capacity of the dryer, dry time, and overall size of the dryer, thus playing a role in the safety of the dryer.

Most clothing dryers in the United States are powered by electricity. In fact, about 80% of household clothing dryers in the United States are electric, while only 20% are gas-powered. This may be due to the additional connection needed in order to run a gas-powered dryer.

A major difference between the structure of gas-powered and electric-powered dryers is the gas line connection that gas-powered dryers must have in addition to an electrical connection. Further, if the gas dryer is also a vented dryer, it will still need to be vented to the outside of the home or to the HVAC system. The gas powered dryer will use less electricity than an electric-powered dryer, as the electricity is merely used to power the lights, fan, drum, and controls of the machine. However, it may be more difficult for homeowners to access the proper gas connection to use these clothing dryers. Gas leak prevention is important when installing and maintaining gas-powered dryers; an expert in gas-powered dryers may need to be contacted in order for proper installation, maintenance, and repair. Since gas-powered dryers utilize both electricity and gas for power, additional caution is needed for fire prevention.

Carbon monoxide can be produced by running a gas-powered dryer, which makes proper ventilation important, and a gas leak in the home can lead to a fire, which makes proper maintenance doubly important.

Electric clothing dryers at their normal size typically have a 240 volt plug and must be used with a separate circuit, although more compact versions may be available with lower voltage plugs. Plugging an electrical dryer into the wrong outlet creates greater risk of an electrical fire.

Most clothing dryers are also vented. A vented dryer takes the moisture from the drying clothes and vents them though ducts from the inside of the clothing dryer to the outside of the building. Ducts can be made of different materials and are usually classified based on rigidity. Materials that can be used for ducting include aluminum, plastic, and vinyl. Aluminum foil ducts are most common and are flexible and must be held onto the dryer using clamps; however, the flexibility of the duct means that lint is more likely to accumulate when compared with less rigid duct materials. Semi-rigid ducts are made out of less flexible aluminum, which can reduce the risk of lint accumulation. Plastic and vinyl ducts are less popular and are associated with higher risk of lint accumulation and overheating than their aluminum counterparts. Flexible aluminum ducts tend to be wider than the more rigid ducts. However, narrow ducts, although they tend to be smoother on the inner surface and thus less susceptible to lint accumulation, can also pose a risk when not properly cleaned as the lint that does accumulate can quickly block the duct.

Ventless dryers, also known as condensing dryers, are usually more widely used in apartments or other spaces that too small or isolated to allow for the exterior ventilation necessary for vented dryers. Ventless dryers are ductless, and instead recirculate air within the dryer drum, extracting moisture and then condensing the moisture. The extracted moisture can then get stored in a removable tank for later disposal.

When a fire starts in a clothing dryer, it is typically due to the ignition of material within the dryer or the dryer duct itself, such as clothing, lint, fiber, or dust. For example, a piece of clothing may get caught in one particularly hot area of the dryer and ignite. Lint buildup may occur if lint traps are not cleaned regularly. Moreover, lint can get trapped and accumulate in sagging dryer ducts, thus blocking the duct, increasing the likelihood of a fire. A rapid response is key to extinguishing a house fire. The earlier a fire is detected, the more quickly it can be extinguished, and damage can then be mitigated.

Thus, fire prevention related to clothing dryer fires is best addressed by identifying and extinguishing fires at their onset. Identifying fires involves early detection by the human senses of sight, smell, sense of temperature, or sound. Extinguishing the fire most often involves contacting a local fire department. Some homeowners keep a fire extinguisher; which may be used if a fire is detected while it is still minor enough to extinguish with a household fire extinguisher. In most instances, home occupants should leave the house as soon as a fire is detected by a smoke alarm and then contact the local fire department. Smoke detectors are important because they allow home occupants to learn of a fire before it has had the chance to spread to many areas of the home. A smoke detector ensures that occupants in the far reaches of a house can respond to a fire as quickly as possible. The thick dark smoke of a house fire can quickly dull the senses, making occupants of a home unable to see, and may even cause drowsiness. However, clothing dryers are often located in a room which is isolated from the main living spaces of a home, such as in a garage or in a laundry or mud room. These spaces are less likely to have smoke detectors than spaces with more foot traffic, such as in a kitchen. Overheating of appliances in areas like the kitchen is thus also more easily detectable because the heat can be felt by individuals going through the area. A burning stovetop pot or an oven fire is readily seen and smelled.

Due to the isolation of rooms containing clothing dryers, a fire may not be readily detected by the sight or smell of smoke. The recommended maximum clothing dryer temperature is 135 degrees Fahrenheit. However, it would be difficult for a user of a dryer to sense overheating or an unexpected temperature increase inside of the dryer without opening it. Moreover, because dryer fires so often start inside the dryer itself, and because dryers typically have a vent in the back of the dryer, the fire may not be readily detectable via sight or sound even to an individual in the same room, as the smoke and fumes of a fire may go through the vent. Additionally, because the smell of smoke would need to travel out of the dryer up to the smoke detector itself, a ceiling-installed detector may not be able to immediately detect a dryer fire.

Accordingly, there remains a need for a solution to at least one of the aforementioned problems. For instance, there is an established need for efficient and effective fire detection and alerting resulting from the overheating of clothing dryers.

SUMMARY OF THE INVENTION

The present invention can be directed to a fire detection device to alert users of a clothing dryer fire. The fire detection device may be configured for use inside a clothing dryer.

While not wishing to be bound by theory, it is believed that home occupants would like to be warned of a potential house fire as quickly as possible.

The term "about" as used herein can entail a variance of 10% greater or lower than the value recited.

The term "comprising" as used herein also encompasses the terms "consisting essentially of" and "consisting of".

The values of any endpoint(s) of any range(s) recited herein can be used to create different ranges or different endpoints of ranges to those described herein. The endpoints in any of the ranges described herein can also include any integer value in the recited range even if not expressly described. Thus, for example, a range of from 1.0 to 10 can include as alternate range endpoints any integer between 1 and 10, such as, the non-limiting integer examples of 2, 3, 4, 5, 6, 7, 8 and 9.

In a first implementation of the invention, the fire detection device may comprise:

a gasket, wherein the gasket is mounted at a clothes dryer between a dryer body and a dryer vent, the gasket having a plurality of perforations;

wherein the plurality of perforations are configured such that they emit an audible sound when in contact with carbon dioxide; and, at least one cartridge, which is affixed to an outer side of the gasket, said cartridge containing carbon dioxide, and wherein the cartridge melts when it comes into contact with fire.

In one aspect of the invention, the plurality of perforations may be located on the inner diameter of the gasket.

In yet another aspect of the invention, the fire detection device can connect to a vent of a clothing dryer.

In another aspect of the invention, the dryer vent may have a heat-resistant cap.

In yet another aspect of the invention, the heat-resistant cap may be made of aluminum.

In yet still one other aspect of the invention, the gasket may be in the shape of a ring.

In yet even another aspect of the invention, the gasket may have an internal diameter of from about 3 inches to about 6 inches, preferably about four inches.

In yet one other aspect of the invention, the plurality of perforations may be made at a specific angle.

In yet even one other aspect of the invention, the cartridge is affixed to the gasket via a bezel.

In yet another aspect of the invention, the gasket may be configured to allow for the venting of the carbon dioxide from the cartridges through the plurality of perforations.

In yet still one other aspect of the invention, there may be openings on the sides of the gasket to allow for attachment of one or more bezels.

In yet another aspect of the invention, the carbon dioxide cartridge has a top end and a bottom end.

In yet still even another aspect of the invention, the bezel may be configured to screw into the gasket and into the bottom end of the carbon dioxide cartridge.

In yet another aspect of the invention, the carbon dioxide cartridge may be replaceable.

In another aspect of the invention, the audible sound emitted from the perforations in the gasket may be at a level of at least 120 decibels.

In a second implementation of the invention there can be provided herein a method of fire detection comprising:

mounting a fire detection device within a clothes dryer, wherein the fire detection device comprises:

a gasket, wherein the gasket is mounted at a clothes dryer between a dryer body and a dryer vent, the gasket having a plurality of perforations, wherein the plurality of perforations are configured such that they emit an audible sound when in contact with carbon dioxide; and, at least one cartridge, which is affixed to an outer side of the gasket, said cartridge containing carbon dioxide, and wherein the cartridge melts when it comes into contact with fire.

In one aspect of the invention, when the method is practiced and carbon dioxide is discharged from the cartridge, the cartridge may be replaced by another containing carbon dioxide.

In another aspect of the invention, the discharge of carbon dioxide may extinguish a fire.

In a third implementation of the invention there can be provided herein a method of fire detection comprising:

perforating a plurality of holes into a gasket, wherein the plurality of perforations are configured such that they emit an audible whistling sound when in contact with a gaseous substance; and wherein the perforations are located on the inner diameter of the gasket; and affixing one or more cartridges to the gasket, wherein the cartridges contain a gaseous substance;

wherein the outer casing of the cartridges melt at a predetermined temperature, releasing said gaseous substance from the cartridge; and wherein the gaseous substance ducts through the perforations of the gasket; and attaching the gasket to a vent of a clothing dryer.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
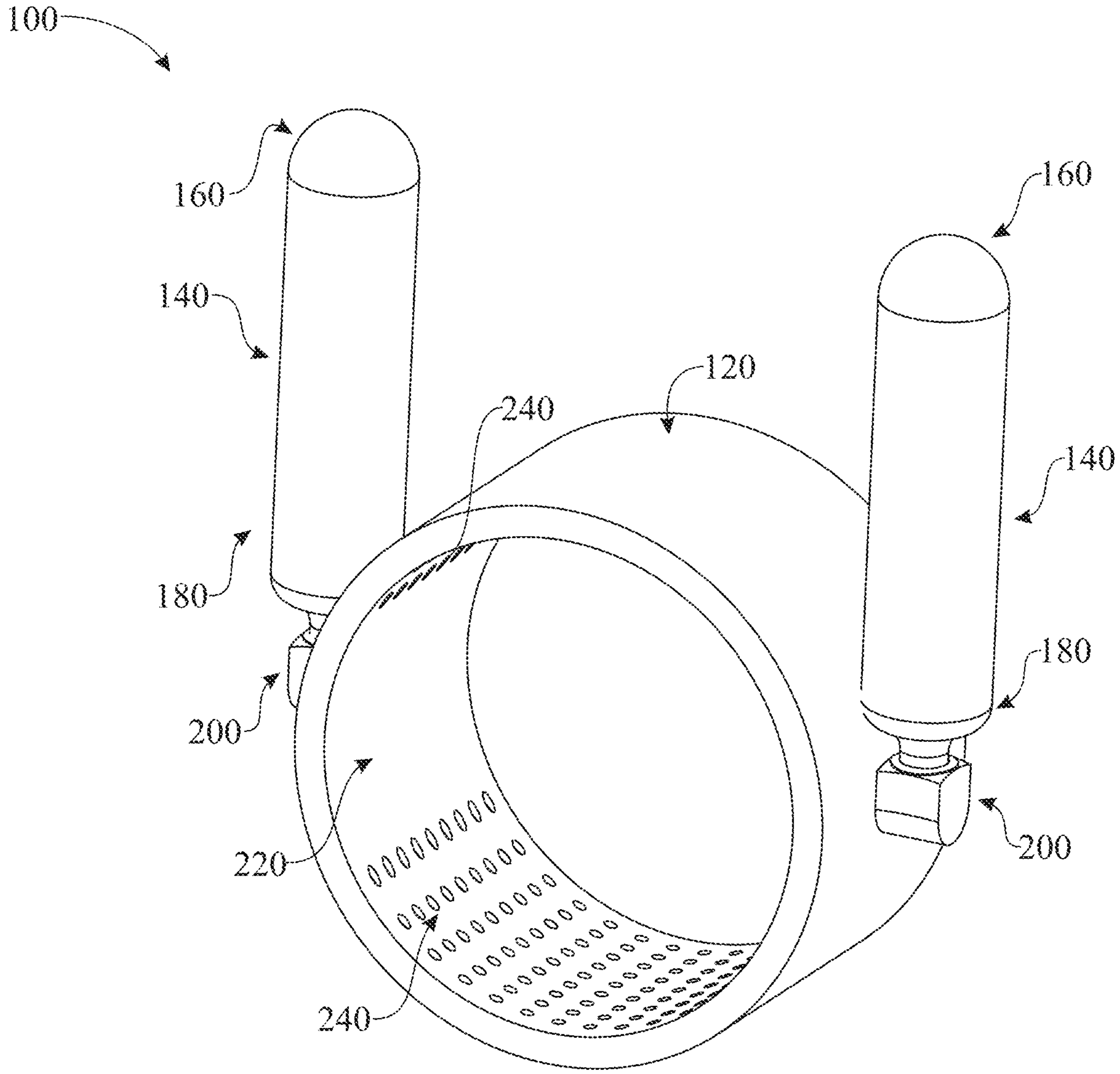
FIG. 1 presents a perspective view of the gasket of the present invention having two cartridges affixed thereto.

Referring initially to FIG. 1, a fire detection device 100 is generally shown. There can be provided a gasket 120 which may be affixed to a cartridge 140. Each cartridge 140 has an upper end 160 and a lower end 180. Cartridge 140 can be made of a material that melts when in contact with dangerous temperatures. “Dangerous temperatures” can be defined The lower end 180 of cartridge 140 can be affixed to gasket 120 via a bezel 200. Bezel 200 may be threaded to both the lower end of cartridge 180 and the gasket 120.

The gasket 120 may have an inner diameter 220. The inner diameter 220 may contain a plurality of perforations 240. All perforations may be made at a specified angle to maximize sound amplification of a gaseous substance venting through the perforations.

In an embodiment of the fire detection device 100, there can be provided two cartridges 140 affixed to the gasket 120.

In another embodiment of the fire detection device 100, there can be provided two bezels 200 on opposing sides of the gasket 120.

In an embodiment of the fire detection device 100, the inner diameter 220 may contain pluralities of perforations 240 dispersed intermittently through the inner diameter 220.

Figure 2:
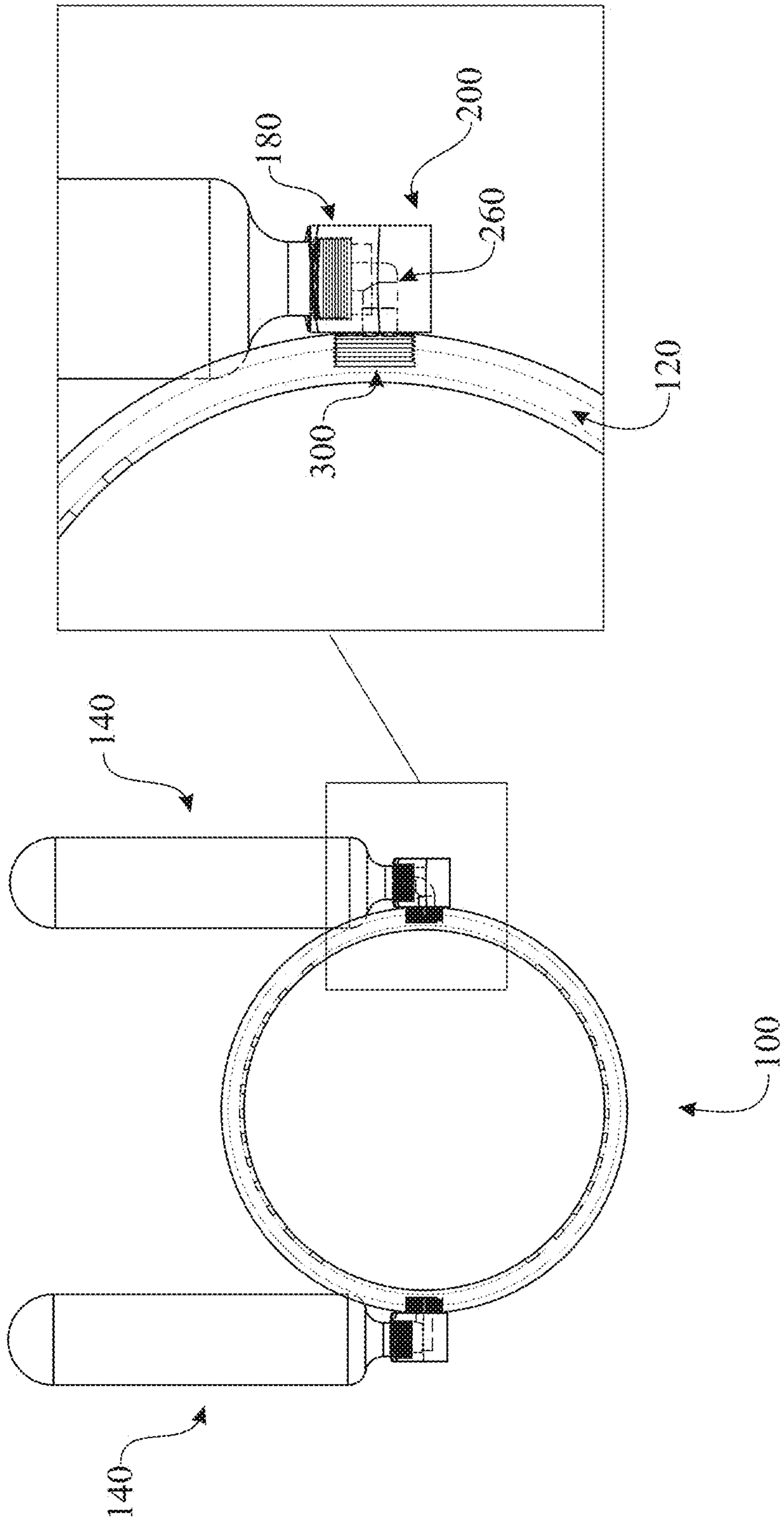
FIG. 2 presents a close-up isometric view of the gasket affixed to the cartridges of FIG. 1 via a bezel.

Referring to FIG. 2, a close up view of the bezel 200 affixed to the gasket 120 and the cartridge 140 is provided. The interior 260 of bezel 200 is hollow to serve as a connection between the lower end of the cartridge 180 and the gasket 300.

Figure 3:
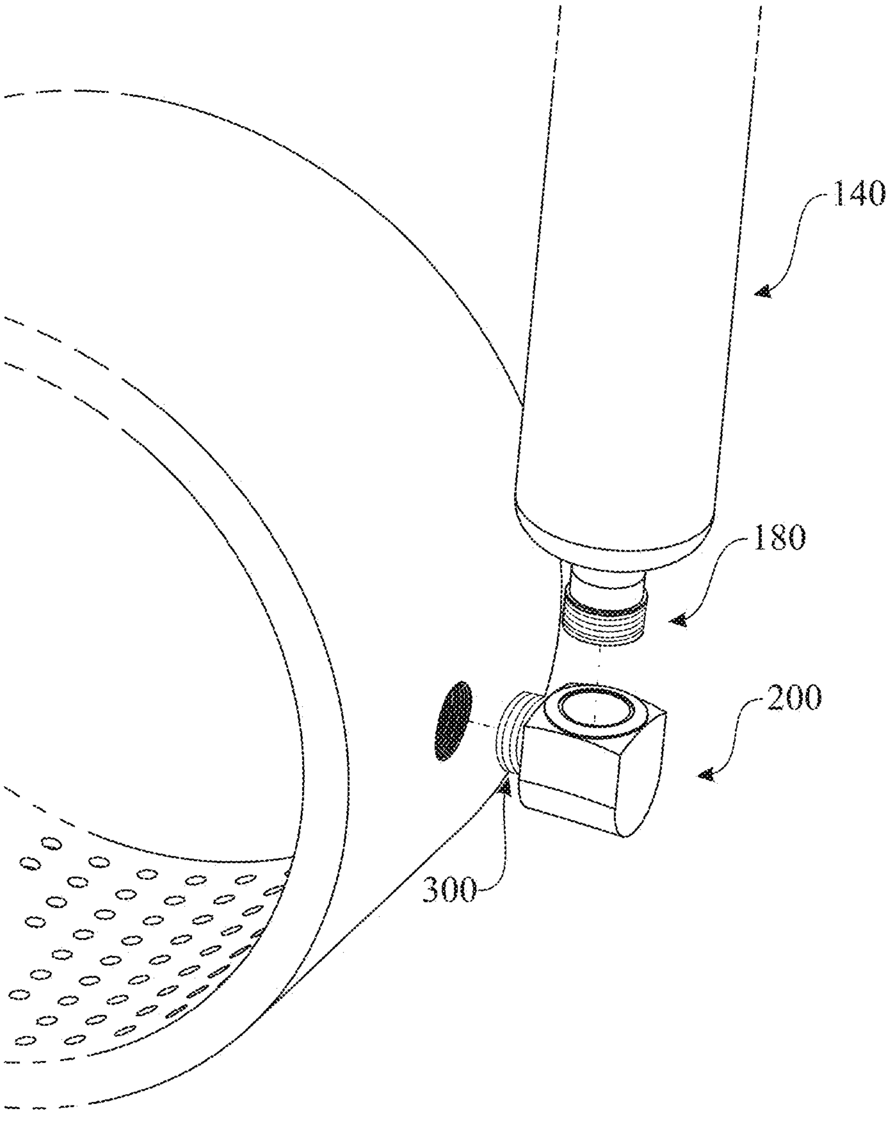
FIG. 3 presents an exploded view of the bezel attachment of FIG. 2.

Referring to FIG. 3, an exploded view of the bezel 200, the gasket 120, and the cartridge 140 is provided. The lower end of cartridge 180 has an exterior threaded portion which can be received by bezel 200. Bezel 200 has an exterior threaded portion 300, which threads into gasket 120.

Figure 4:
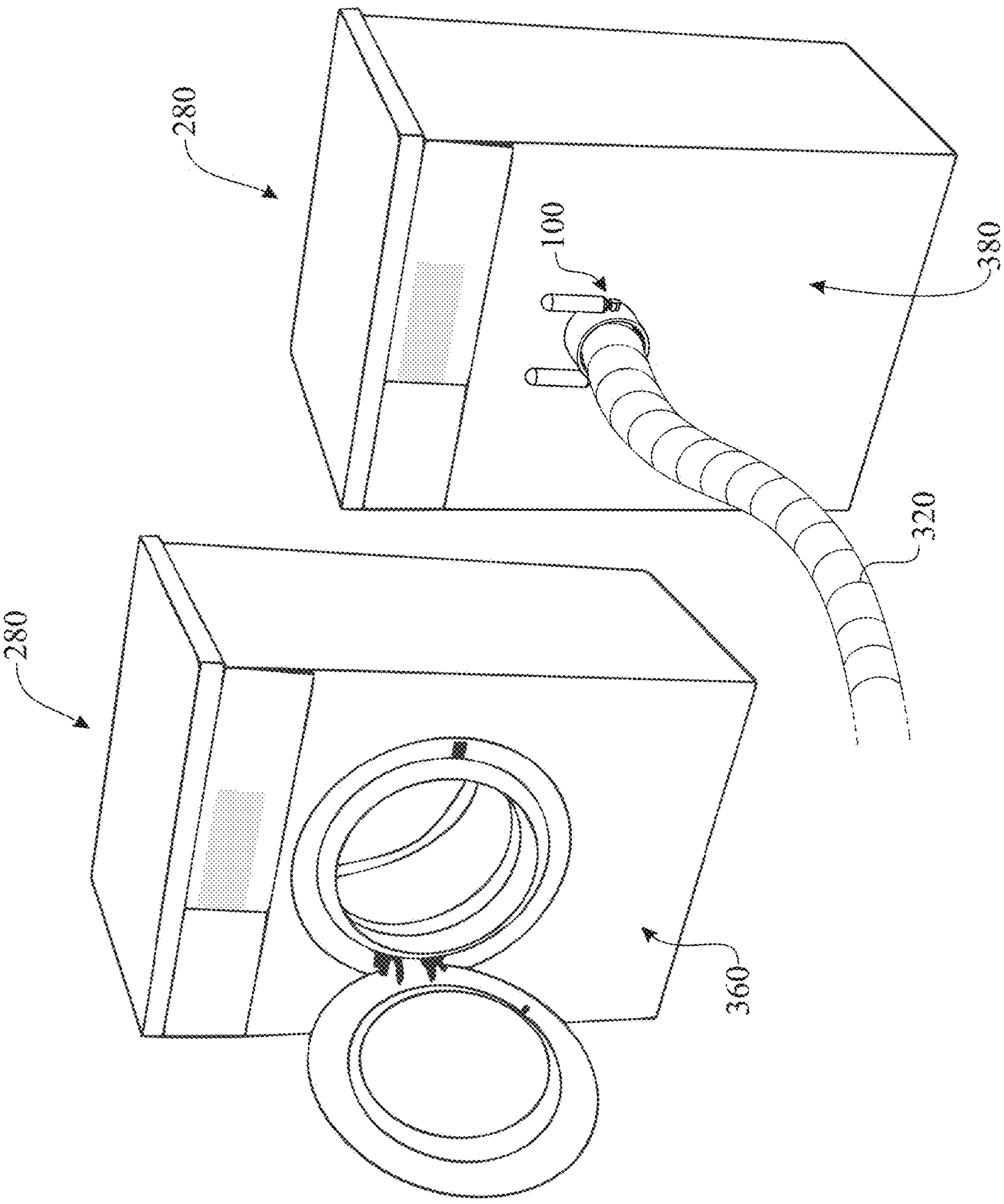
FIG. 4 presents a front and back view of a clothing dryer, with the invention of FIG. 1 affixed to the dryer vent at the back of the dryer.

Referring to FIG. 4, a front 360 and back 380 of a clothing dryer body 280 is shown. The fire detection device 100 may be affixed to the clothing dryer 280 at the back 380, between the dryer body 280 and a dryer duct 320.

Figure 5:
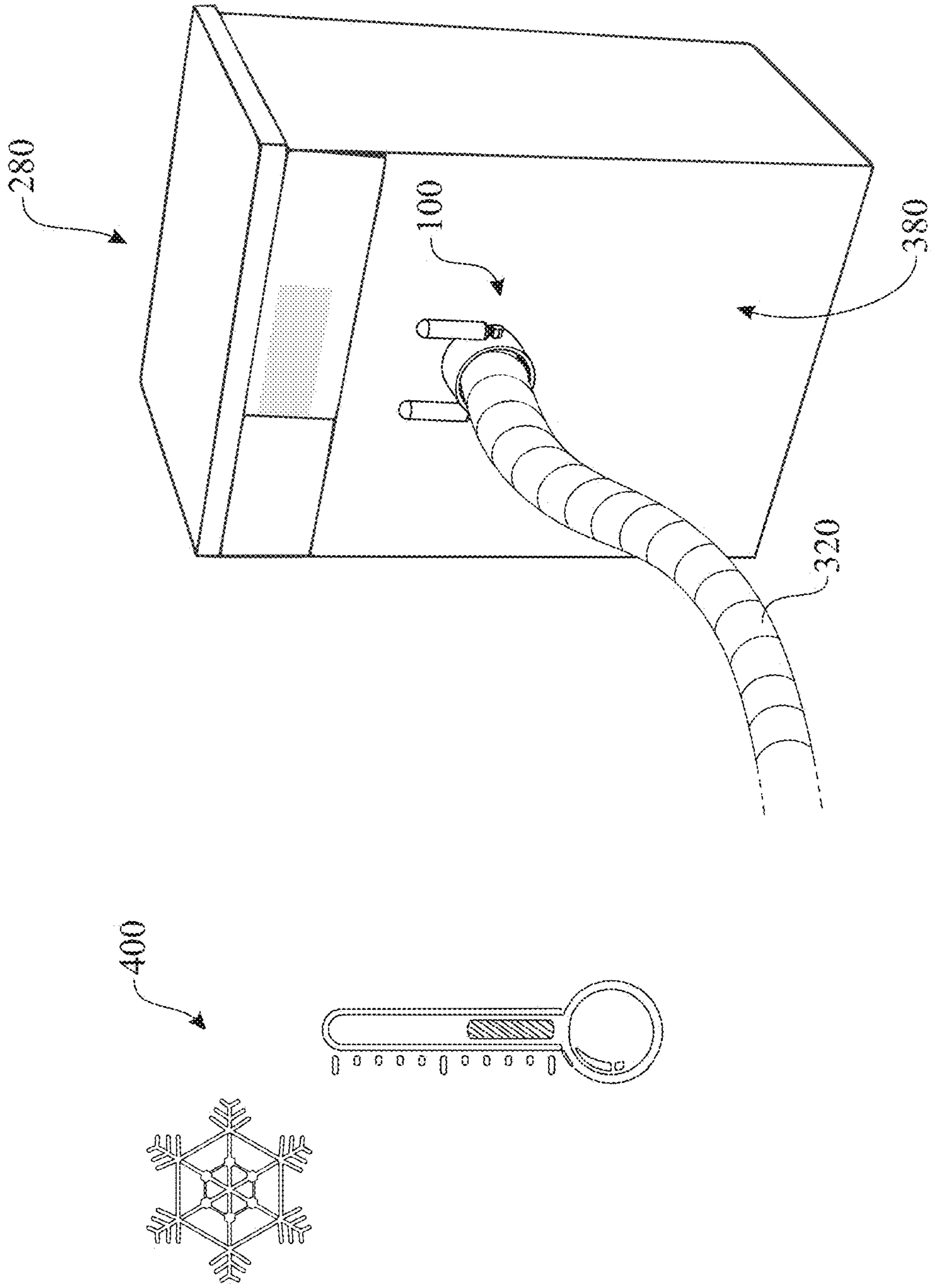
FIG. 5 presents an image of the clothing dryer of FIG. 4 in temperature conditions that do not melt the outer casing of cartridges.

Referring to FIG. 5, the back of dryer 380 is shown as in FIG. 3 under non-dangerous temperature conditions 400. Fire detection device 100 may be placed between dryer body 280 and dryer duct 320. Non-dangerous temperature conditions are insufficient to melt the outer casing of the cartridges of fire detection device 100.

Figure 6:
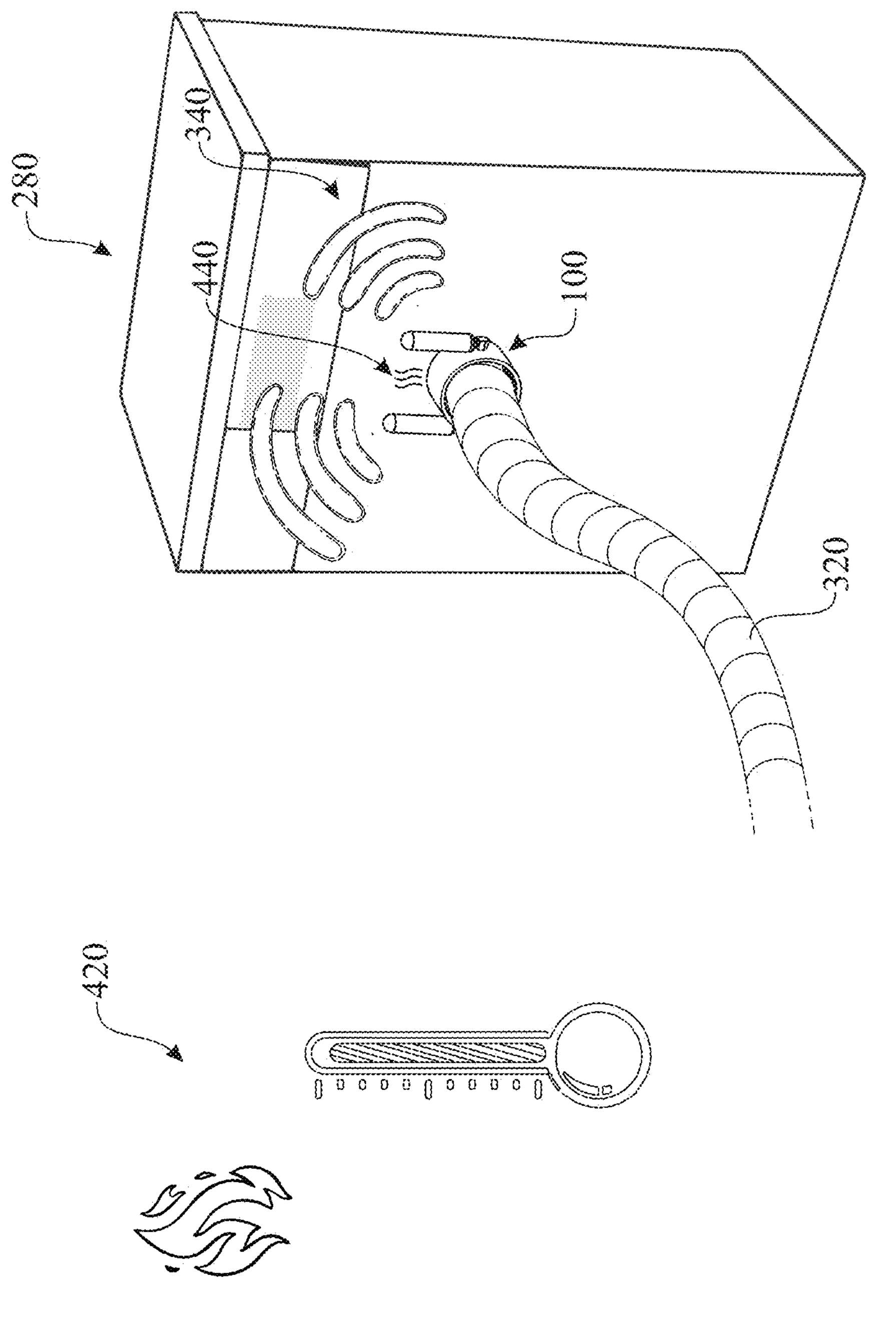
FIG. 6 presents an image of the clothing dryer of FIG. 4 in temperature conditions that melt the outer casing of the cartridges, triggering the release of carbon dioxide and resulting emission of an audible noise from the perforations of the gasket.

Referring to FIG. 6, the back of dryer 380 is shown under dangerous temperature conditions 420. Fire detection device 100 may be placed between dryer body 280 and dryer duct 320.

Dangerous temperature conditions are sufficient to melt the outer casing of the cartridges of fire detection device 100, thus releasing a gaseous substance 440. Gaseous substance 440 may vent through the perforations in fire detection device 100, emitting an audible noise 280.

In an embodiment of the invention, the gaseous substance 440 may be carbon dioxide. Carbon dioxide, when vented through perforations made at a particular angle, emits a loud audible noise capable of alerting those in a wide-ranging surrounding area.

Figure 7:
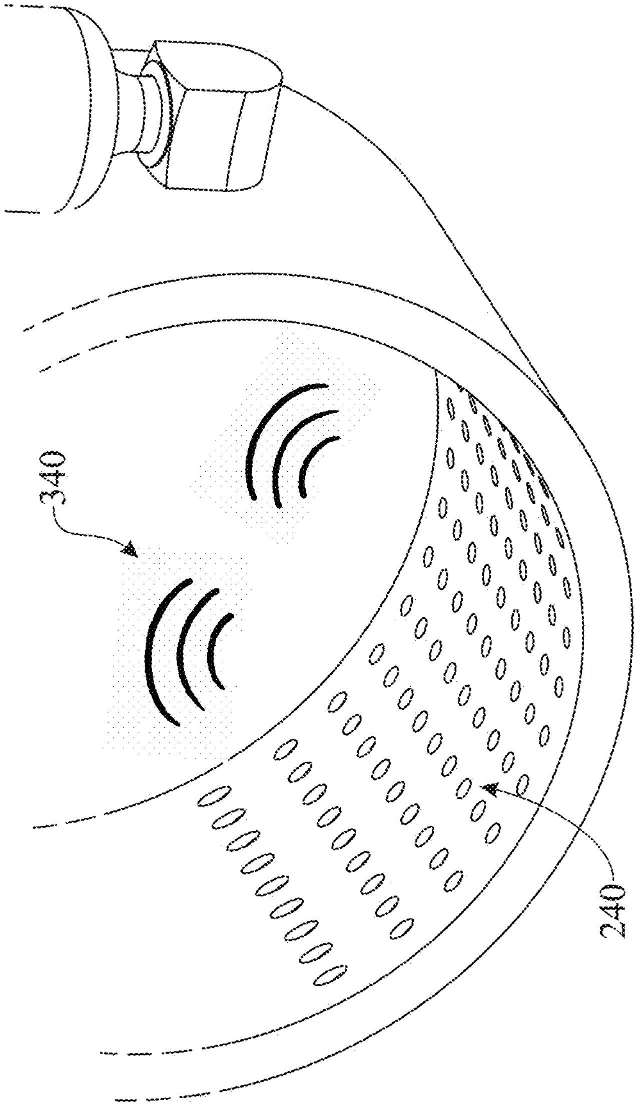
FIG. 7 presents a close-up image of the emission of the audible noise from the perforations in the gasket.

Referring to FIG. 7, a close-up view is provided showing the flow of gaseous substance 440 through perforations 240, which can result in the emission of a loud audible noise 340.

Carbon dioxide discharged from the cartridges may also assist with extinguishing a potential fire.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A fire detection device for a clothes dryer comprising:

a gasket, wherein the gasket is mounted at a clothes dryer between a dryer body and a dryer vent, the gasket having a plurality of perforations, wherein the plurality of perforations are configured such that they emit an audible sound when in contact with carbon dioxide; and, at least one cartridge, which is affixed to an outer side of the gasket, said cartridge containing carbon dioxide, and wherein the cartridge melts when it comes into contact with fire.

2. The fire detection device of claim 1, wherein the plurality of perforations are located on the inner diameter of the gasket.

3. The fire detection device of claim 1, wherein the gasket is in the shape of a ring.

4. The fire detection device of claim 1, wherein the gasket has an internal diameter of from about 3 inches to about 6 inches.

5. The fire detection device of claim 1, wherein the plurality of perforations are at an angle.

6. The fire detection device of claim 1, wherein the cartridge is affixed to the gasket via a bezel.

7. The fire detection device of claim 1, wherein the gasket is configured to allow for the venting of the carbon dioxide from the cartridges through the plurality of perforations.

8. The fire detection device of claim 1, wherein the carbon dioxide cartridge is replaceable.

9. The fire detection device of claim 1, wherein the audible sound emitted from the perforations in the gasket are at a level of at least 120 decibels.

10. The fire detection device of claim 1, wherein the fire detection device is connected to a vent of a clothing dryer.

11. The fire detection device of claim 10, wherein invention, the dryer vent has a heat-resistant cap.

12. The fire detection device of claim 11, wherein the heat-resistant cap is made of aluminum.

13. The fire detection device of claim 1, further comprising openings on the sides of the gasket to allow for attachment of one or more bezels.

14. The fire detection device of claim 13, wherein the carbon dioxide cartridge has a top end and a bottom end and the bezel is configured to screw into the gasket and into the bottom end of the carbon dioxide cartridge.

15. A method of fire detection comprising:

mounting a fire detection device at a clothes dryer, wherein the fire detection device comprises:

a gasket, wherein the gasket is mounted at a clothes dryer between a dryer body and a dryer vent, the gasket having a plurality of perforations, wherein the plurality of perforations are configured such that they emit an audible sound when in contact with carbon dioxide; and, at least one cartridge, which is affixed to an outer side of the gasket, said cartridge containing carbon dioxide, and wherein the cartridge melts when it comes into contact with fire.

16. The method of claim 15, further comprising replacing the cartridge after the carbon dioxide is discharged from the cartridge.

17. The method of claim 15 further comprising extinguishing a fire within the clothes dryer with the carbon dioxide from the cartridge.

18. A method of fire detection comprising:

perforating a plurality of holes into a gasket, wherein the plurality of perforations are configured such that they emit an audible whistling sound when in contact with a gaseous substance and, wherein the perforations are located on the inner diameter of the gasket;

affixing one or more cartridges to the gasket, wherein the cartridges contain a gaseous substance and wherein the outer casing of the cartridge melts at a predetermined temperature, releasing said gaseous substance from the cartridge and wherein the gaseous substance ducts through the perforations of the gasket; and, attaching the gasket to a vent of a clothing dryer.

19. The method of claim 18, wherein the gaseous substance is carbon dioxide.

20. The method of claim 18, wherein the gasket is attached between a dryer body and the dryer vent.

* * * * *